3,432,452
FOAMABLE POLYVINYL CHLORIDE COMPOSITIONS AND PROCESS OF MAKING FOAMS THEREFROM

Harold R. Hersh, Cherry Hill, N.J., and John E. Boyce, East Lansdowne, Pa., assignors to Atlantic Richfield Company, Philadelphia, Pa., a corporation of Pennsylvania
No Drawing. Filed Aug. 24, 1965, Ser. No. 482,273
U.S. Cl. 260—2.5    10 Claims
Int. Cl. C08f 47/10, 29/18

ABSTRACT OF THE DISCLOSURE

This invention relates to foamable polyvinyl chloride compositions and to the foams prepared therefrom which utilize as the blowing agent component a mixture of:

(1) From about 15 to about 25 percent, based upon the total weight of (1) and (2), of a high temperature blowing agent which evolves gas at a temperature from about the gelation temperature to about 20° F. above the gelation temperature of said plastisol, and (2) From about 75 to about 85 percent, based upon the total weight of (1) and (2), of a low temperature blowing agent which evolves gas at a temperature ranging from about 30° F. to about 60° F. below the gelation temperature of said plastisol.

The preferred compositions also utilize a particular combination of high and low solvating plasticizers. The polyvinyl chloride foams prepared by this invention have good porosity coupled with high physical strength.

---

This invention relates to expanded polyvinyl chloride compositions. More particularly, this invention relates to a particular blowing agent combination which provides gas evolution over a wide temperature range and to polyvinyl chloride foams having high porosity, good physical strength and small uniform pore size produced therefrom.

The production of polyvinyl chloride foams by the addition of a blowing agent to a plasticized polyvinyl chloride composition and subsequent heating of the mixture is well known in the art. Generally speaking, this is accomplished by dispersing the blowing agent in a polyvinyl chloride plastisol and heating the mixture through the gelation stage to provide the polyvinyl chloride foam. The gelation temperature as used throughout the specification and claims represents an art-recognized concept, and may be defined as that temperature at which the plastisol composition becomes immobile as a result of increased viscosity due to the solvation of the resin by the plasticizer. A more comprehensive definition and explanation of the gelation temperature of polyvinyl plastisols may be found in U.S. Patent 2,888,414 whose disclosure is hereby incorporated by reference as part of the teaching of the present application.

When a polyvinyl chloride plastisol composition is expanded below the gelation temperature by the action of a blowing agent, the evolving gas creates a multitude of small cells within the composition. The cell walls, however, do not have sufficient strength to contain the gas and, consequently, they rupture and fissure soon after formation. This creates what is commonly called an open cell foam in which the cells are interconnected through the openings created through the rupture points. This foam has high porosity and a wide range of cell sizes. However, due to the presence of a fissure, it has very little physical strength.

When a plastisol composition is expanded at or above the gelation temperature, the cell walls have sufficient strength to contain the gas throughout evolution without rupturing. The resultant cell structure is a nework of closed, individual cells having a fairly narrow cell size range. These foams have good physical strength but are not very porous.

Unexpectedly, we have discovered that by combining two or more blowing agents, each of which evolves gas within certain different temperature ranges, with a plastisol in certain proportions, a foamable mixture is obtained which, when heated through its gelation stage, provides a strong microporous polyvinyl chloride foam. More specifically, the novel foamable mixtures of the invention provide polyvinyl chloride foams having the porosity normally attributable to an open cell structure and the strength characteristic of a closed cell structure. The individual cells of the polyvinyl chloride foams obtained in accordance with the invention are much smaller and much more uniform than those found in conventional open or closed cell polyvinyl chloride foams heretofore obtained.

Briefly stated, the foamable composition of the present invention comprises a polyvinyl chloride plastisol and a blowing agent mixture, in an amount sufficient to foam said plastisol upon heating to provide a strong microporous polyvinyl chloride foam, said blowing agent mixture comprising:

(1) From about 15 to about 25 percent, based upon the total weight of (1) and (2), of a high temperature blowing agent which evolves gas at a temperature ranging from the gelation temperature to about 20° F. above the gelation temperature of said plastisol, and (2) From about 75 to about 85 percent, based upon the total weight of (1) and (2), of a low temperature blowing agent which evolves gas at a temperature ranging from about 30° F. to about 60° F. below the gelation temperature of said plastisol.

The strong microporous foams of this invention may be produced by heating the foamable compositions of the invention at a temperature above their gelation temperatures but below their degradation temperatures for a period of time sufficient to fuse said composition and provide a strong microporous polyvinyl chloride foam.

It is critical to the practice of this invention that the high temperature blowing agents have a gas evolution temperature which is not less than the gelation temperature or more than about 20° F. above the gelation temperature of the plastisol. It is also critical to the successful practice of this invention that the low temperature blowing agent have a gas evolution temperature which is not less than about 30° F. nor more than about 60° F. below the gelation temperature of the plastisol. Preferably, the low temperature blowing agent will have a gas evolution temperature ranging from about 30° F. to about 50° F. below the gelation temperature.

It is necessary to combine the high temperature and low temperature blowing agents in certain proportions so as to maintain an essentially continuous evolution of gas over the entire foaming cycle. In general, it has been found that this may be accomplished by utilizing a mixture containing from about 75 to about 85 percent of the low temperature blowing agent and from about 15 to about 25 percent of the high temperature blowing agent based upon the total weight of the two blowing agents used.

The total blowing agent loading is dependent upon the particular properties desired in the final foam composition. Generally speaking, an amount of blowing agent sufficient to foam said plastisol upon heating to provide a strong microporous polyvinyl chloride foam should be employed. For most applications, the total blowing agent loading may range from about 4 to about 12 parts per 100 parts of polyvinyl chloride resin.

The essence of this invention lies not in the use of a particular blowing agent but in a specific combination of two or more blowing agents which evolve gas at temperatures within certain critical ranges below, at or above the gelation temperature of the plastisol. It has also been found that by changing the total loading of blowing agents and by altering the amounts of each particular blowing agent, foams having a wide variety of properties may be produced. For example, the water and gas transmission rates, physical strength, density and cell size may be altered by a proper selection of the particular blowing agents and regulation of their respective amounts.

The blowing agents which may be utilized in the practice of this invention are well known in the art. In general, they encompass a class of compounds which evolve substantial amounts of gas at a temperature near the gelation but below the degradation point of the plastisol and are capable of being homogeneously dispersed in the plasticizer. The gas evolution may be caused by sublimation, decomposition or vaporization. For example, sublimation compounds such as piccolinic acid and oxalic acid, decomposition agents such as N,N'-dimethyl-N,N'-dinitrosoterephthalamide, semi-carbazide, malonic acid, azobisbutyronitrile, p,p'-oxybis (benzene sulfonylhydrazide), dinitrosopentamethylenetetramine, barium azodicarboxylate and azodicarbonamide, or liquids such as cycloheptane, cyclopentanone, methyl propyl ketone, 1-pentanol and water may be utilized as the particular blowing agents of this invention.

While liquid blowing agents may be utilized in the practice of this invention, it is preferable to employ solids which either decompose or sublime to evolve substantial amounts of gas inert to polyvinyl chloride at the proper temperatures. A most preferred embodiment utilizes solid compounds which evolve nitrogen at the proper temperatures, such as azobisbutyronitrile which evolves nitrogen at about 220° F. and p,p'-oxybis (benzene sulfonylhydrazide) which evolves nitrogen at 300° F.

It is well known in the art that the gas evolution temperature of a blowing agent may be altered. For example, the gas evolution temperature of a solid blowing agent may be lowered by adding a catalyst or promoter to the system. Correspondingly, the boiling point of a liquid blowing agent may be altered by varying the pressure or by the addition of certain compounds. In this regard, therefore, it is possible in the practice of this invention to utilize compounds which under standard conditions evolve gas at a temperature outside the required range. By incorporating the proper substance or selecting the proper conidtions, the gas evolution temperature may be brought within the proper range. For example, a high temperature blowing agent such as azodicarbonamide having a normal gas evolution temperature of 385° F. may be combined with a catalytic amount of a promoter such as zinc acetate to obtain an actual gas evolution temperature of approximately 260° F.

It has been found that a particularly preferred system utilizes a polyvinyl chloride plastisol having a gelation temperature of about 250° F. in combination with a blowing agent mixture comprising from about 75 to about 85 percent of N,N'-dimethyl-N,N'-dinitrosoterephthalamide and from about 15 to about 25 percent of an azodicarbonamide-zinc acetate mixture, based upon the total weight of the N,N'-dimethyl-N,N'-dinitrosoterephthalamide and azodicarbonamide-zinc acetate employed. The amount of zinc acetate added to the azodicarbamide may vary to a large extent. Generally speaking, sufficient zinc acetate is added to lower the gas evolution temperature of the azodicarbonamide to about 250° F.–270° F. This may be attained by adding from about 1 to about 10 parts of zinc acetate to about 100 parts of the azodicarbonamide.

The plasticizer which is utilized in the practice of this invention may be used to control the gelation temperature of the plastisol. It has been found to be more practical to first select the desired blowing agents and thereby define the approximate gelation temperature at which the blowing agents will function in accordance with this invention and then through the use of particular plasticizers to attain a plastisol having the selected gelation temperature. In general, the solvating power of the plasticizers determines the gelation temperature of the plastisol, with the higher solvating power imparting a lower gelation temperature. Therefore, it is preferable in the practice of this invention to employ a combination of high and low solvating plasticizers to balance the plastisol gelation temperature with the gas evolution temperatures of the high and low tempearture blowing agents. It is preferable to utilize a combination of plasticizers comprising from about 40 to about 70 weight percent of a low solvating plasticizer and from about 30 to about 60 weight percent of a high solvating plasticizer. The terms "high solvating and low solvating plasticizers" are widely usde in the plastisol art and represent plasticizers which provide gelation temperatures of about 200° F. to 250° F. and about 250° F. to 300° F. respectively. High solvating plasticizers which may be utilized in the practice of this invention include but are not limited to dioctyl phthalate, diisooctyl phthalate and tritolyl phosphate. Examples of low solvating plasticizers include didecyl phthalate and polymeric plasticizers such as polyesters and epoxidized oils. The choice and amount of a particular plasticizer is dependent upon the specific properties desired in the final composition. By varying the plasticizer content, rigid, semi-rigid or flexible foams may be produced. Generally, the total plasticizer content ranges from about 40 to about 120 parts and, preferably, from about 40 to about 80 parts by weight per 100 parts polyvinyl chloride resin. The actual plasticizer loading must provide a paste viscosity sufficient to retain the gas evolved by the low temperature blowing agent. In general, a paste viscosity in excess of about 1000 centipoises is sufficient.

The polyvinyl chloride resins which may be utilized in the practice of this invention are those resins which are capable of forming a plastisol when dispersed in plasticizer. They are known in the art as plastisol grade resins and usually have a particle size ranging from about .1 to about 50 microns. They are normally prepared by polymerizing vinyl chloride in an emulsion-type environment and subsequently spray-drying to form fine, dry particles.

Additional ingredients which are commonly incorporated into plastisols to retain or enhance the basic properties may be incorporated into the compositions of this invention in functional amounts without departing from the scope of this invention. Common examples of these ingredients include heat and ultraviolet light stabilizers, secondary plasticizers, anti-blocking agents, impact and paste viscosity improvers. The term "plastisol" as used throughout this specification and claims includes plastisol formulations containing minor amounts of polyvinyl chloride solvents. These compositions are commonly referred to as organosols.

In order to demonstrate more fully how this invention may be practiced, the following example is given as an illustration and is not meant to be construed as a limitation on the scope of the invention.

Example I

A foamable composition was prepared by blending the plastisol formulation with the blowing agents listed in Table I. All ingredients were mixed in a Hobart mixer until a homogeneous paste was obtained. A 10 to 20 mil film of this plastisol was deposited upon release paper which was then placed into a 350° F. hot air oven under atmospheric pressure. The compositions were allowed to expand until the plastisol had fused. The approximate oven time was 5 to 7 minutes. All parts in this example are by weight. The plastisol formulation is set forth below.

Plastisol Formulation

| | Parts |
|---|---|
| Polyvinyl chloride (plastisol grade [1]) | 100 |
| Didecyl phthalate | 35 |
| Dioctyl phthalate | 25 |
| Cadmium/barium laurate [2] | 2 |
| Carbon black | 1 |
| Fatty alcohol sodium sulfate [3] | 1 |
| Talc | 2 |

[1] Geon 121—A product of B. F. Goodrich Co.
[2] Mark WS—A product of Argus Chemical Co.
[3] Duponol ME—A product of E. I. du Pont.

TABLE I

| Formulation number | 1 | 2 | 3 |
|---|---|---|---|
| Plastisol formulation [1] | 166 | 166 | 166 |
| Nitrosan [2] | 8 | | 7 |
| Azodicarbonamide [3] | | 8 | 1.1 |
| Water | | | 1 |
| Zinc acetate | | | .06 |
| Properties: | | | |
| Cell type | Open | Closed | |
| Range of cell sizes (microns) | 10–70 | 9–27 | 2–18 |
| Average cell size (microns) | 23.2 | 17.5 | 6.9 |
| Standard deviation (microns) | 14.3 | 4.6 | 4.0 |
| Water vapor transmission rate, grams/(meter)²/day | 600 | 35 | 225 |
| Gas transmission rate, cc./(meter)²/day/atm.×10⁻⁸ | 10,000 | 1 | 100 |
| Tear strength (p.s.i.) | ([4]) | 100 | 138 |
| Tensile strength (p.s.i.) | 110 | 625 | 711 |
| Density (lbs./ft.³) | 34.3 | 75 | 42 |

[1] The plastisol formulation had a gelation temperature of about 250° F.
[2] A product of E. I. du Pont having a gas evolution temperature of approximately 205° F. and containing 70 percent N, N'-dimethyl-N,N'-dinitrosoterephthalamide and 30 percent inert diluent.
[3] Celogen AZ—A product of Naugatuck Chemical Co.—When combined with the zinc acetate, the gas evolution temperature was 260° F.
[4] Too low to measure.

Formulation No. 1 which is an open cell foam has high porosity, large cell size and range but very little physical strength. The closed cell foam, represented by formulation No. 2, has very little porosity, a smaller cell size and range and high physical strength. Formulation No. 3, representing a composition of this invention, has both high porosity extremely small cell size and range and good physical strength.

The foams of this invention may be used in numerous applications as a substitute for leather. For example, they may be used to produce handbags, gloves, wallets, luggage, jackets and other leather articles or in rigid applications such as filtration media or battery plate separators. Furthermore, a grain appearance may be readily embossed into the surface of the foam to provide a leather-like appearance. These foams may also be reinforced by laminating a fibrous layer to one side of the foam to provide the additional strength normally required in upholstery and shoe applications. This is commonly achieved by depositing a coating of foamable plastisol on a fibrous material, then foaming the entire mass, or by laminating an expanded sheet onto a fibrous material. The use of this backing increases the dimensional stability of the foam and provides greater physical strength to the ultimate sheet.

For example, a preferred reinforcing medium is an elastic knit fabric having staple fibers anchored in a substantially perpendicular relationship with the plane of fabric. This medium may be produced by needle punching the fibers through the fabric. The elasticity of the knit fabric should be at least about 20 percent. Preferably a cotton knit fabric is utilized. The staple fibers may be natural or synthetic fibers ranging up to about 2 inches in length. These fibers should be less than 40 denier and preferably less than 18 denier. The total weight of staple fibers should exceed the weight of the knit fabric and preferably ranges from about 1½ to about 3 times the weight of the knit fabric. This reinforcing medium provides three dimensional stability to the foam.

In the following claims, all parts are by weight.

We claim:
1. A foamable composition comprising:
   (A) a polyvinyl chloride plastisol and
   (B) a blowing agent mixture in an amount sufficient to foam said plastisol upon heating, said blowing agent mixture comprising:
      (1) from about 15 to about 25 percent, based upon the total weight of (1) and (2), of a high temperature blowing agent which evolves gas at a temperature from about the gelation temperature to about 20° F. above the gelation temperature of said plastisol, and
      (2) from about 75 to about 85 percent, based upon the total weight of (1) and (2), of a low temperature blowing agent which evolves gas at a temperature ranging from about 30° F. to about 60° F. below the gelation temperature of said plastisol.

2. A foamable composition comprising:
   (A) a polyvinyl chloride plastisol and
   (B) from about 4 to about 12 parts based on 100 parts polyvinyl chloride resin of a blowing agent mixture comprising:
      (1) from about 15 to about 25 percent, based upon the total weight of (1) and (2), of a high temperature blowing agent which evolves gas at a temperature ranging from about the gelation temperature to about 20° F. above the gelation temperature of said plastisol, and
      (2) from about 75 to about 85 percent, based upon the total weight of (1) and (2), of a low temperature blowing agent which evolves gas at a temperature ranging from about 30° F. to about 60° F. below the gelation temperature of said plastisol.

3. The foamable composition of claim 1 wherein the gas evolved from the blowing agent mixture is nitrogen.

4. The foamable composition of claim 2 wherein the plastisol contains a combination of plasticizers comprising:
   (A) from about 40 to about 70 percent of a low solvating plasticizer which imparts a gelation temperature of from 250° F. to 300° F. and
   (B) from about 30 to about 60 percent of a high solvating plasticizer which imparts a gelation temperature of from 200° F. to 250° F., based upon the total weight of the low and high solvating plasticizers.

5. A foamable composition comprising in parts by weight:
   (A) a polyvinyl chloride plastisol having a gelation temperature of about 250° F. and
   (B) from about 4 to about 12 parts based on 100 parts polyvinyl chloride resin of a blowing agent mixture comprising:
      (1) from about 15 to about 25 percent, based upon the total weight of (1) and (2), of an azodicarbonamide-zinc acetate mixture having a gas evolution temperature from about 250° F. to about 270° F. and
      (2) from about 75 to about 85 percent, based upon the total weight of (1) and (2), of N,N'-dimethyl-N,N'-dinitrosoterephthalamide.

6. A process which comprises heating the composition of claim 1 at a temperature above the gelation temperature and below the degradation temperature of said composition for a period of time sufficient to fuse said composition and provide a strong microporous polyvinyl chloride foam.

7. A process which comprises heating the composition of claim 2 at a temperature above the gelation temperature and below the degradation temperature of said composition for a period of time sufficient to fuse said composition and provide a strong microporous polyvinyl chloride foam.

8. A process which comprises heating the composition of claim 3 at a temperature above the gelation temperature and below the degradation temperature of said composition for a period of time sufficient to fuse said composition and provide a strong microporous polyvinyl chloride foam.

9. A process which comprises heating the composition of claim 4 at a temperature above the gelation temperature and below the degradation temperature of said composition for a period of time sufficient to fuse said composition and provide a strong microporous polyvinyl chloride foam.

10. A process which comprises heating the composition of claim 5 at a temperature above the gelation temperature and below the degradation temperature of said composition for a period of time sufficient to fuse said composition and provide a strong microporous polyvinyl chloride foam.

References Cited

UNITED STATES PATENTS

| 3,278,466 | 10/1966 | Cram et al. | 260—2.5 |
| 3,305,496 | 2/1967 | Riley et al. | 260—2.5 |
| 3,321,413 | 5/1967 | Riley et al. | 260—2.5 |

MURRAY TILLMAN, *Primary Examiner.*

M. FOELAK, *Assistant Examiner.*

U.S. Cl. X.R.

260—41, 31.8, 30.6